United States Patent [19]
Kronz et al.

[11] Patent Number: 5,814,398
[45] Date of Patent: Sep. 29, 1998

[54] IN SITU VEHICLE BED LINER AND METHOD OF FORMING SAME

[75] Inventors: Michael L. Kronz; Joseph G. Fabick, Jr., both of Madison; Kara L. Traxler, Merrimac, all of Wis.

[73] Assignee: Fabick, Inc., Madison, Wis.

[21] Appl. No.: 620,920

[22] Filed: Mar. 22, 1996

[51] Int. Cl.$^6$ .................................................. C08G 18/10
[52] U.S. Cl. ................. 428/338; 428/339; 428/422.8; 428/423.1; 428/425.8; 427/421; 427/426; 427/292
[58] Field of Search .................. 528/68; 428/422.8, 428/423.1, 425.8, 338, 339; 427/421, 426, 292

[56] References Cited

U.S. PATENT DOCUMENTS

| | | | |
|---|---|---|---|
| 3,762,677 | 10/1973 | Adams | 249/56 |
| 3,815,200 | 6/1974 | Adams | 264/45 |
| 3,844,030 | 10/1974 | Wilkinson | 117/213 |
| 4,695,618 | 9/1987 | Mowrer | 528/55 |
| 4,751,129 | 6/1988 | Ramalingam et al. | 428/413 |
| 4,913,873 | 4/1990 | Robbins, II | 264/516 |
| 5,059,634 | 10/1991 | Smith | 521/167 |
| 5,084,521 | 1/1992 | White | 523/436 |
| 5,124,426 | 6/1992 | Primeaux et al. | 528/60 |
| 5,418,260 | 5/1995 | Smith | 521/159 |
| 5,422,414 | 6/1995 | Smith | 528/60 |

*Primary Examiner*—Rachel Gorr
*Attorney, Agent, or Firm*—Foley & Lardner

[57] ABSTRACT

An in situ vehicle bed liner together with a method for production of the liner is provided. A vehicle bed is prepared by sandblasting and cleaning, and surfaces adjacent to where the liner is to be formed are protected. A two component polyurethane, polyurea or polyurethane/polyurea hybrid is utilized to create the liner, with the two components maintained separately until application to the vehicle bed. A spray gun is used to create the sides of the liner, mixing together the two polymer components just prior to exiting the spray gun. The polymer composition reaches it gel point almost immediately upon contact with the vehicle bed to prevent running or sagging of the polymer material. The polymer is sprayed on the sides of the vehicle bed to produce contiguous sides of the liner and allowed to gel. The two component polymer material is then poured on the floor of the vehicle bed and adjoins the polymer sides of the liner to produce a contiguous liner. The polymer is then cured to form the vehicle bed liner.

20 Claims, 3 Drawing Sheets

IN SITU VEHICLE BED LINER AND METHOD OF FORMING SAME

FIELD OF THE INVENTION

This invention relates generally to the field of vehicle bed liners and to processes of preparing a vehicle bed liner in situ and the product thereof.

BACKGROUND OF THE INVENTION

Vehicle bed liners have been widely utilized in the past to cover the beds of vehicles such as dump trucks, pickup trucks and other utility vehicles. Bed liners both protect the vehicle bed against scratches and dents, and create an impact-absorbing barrier. The typical prior art vehicle bed liner has been created from molded polymer material.

Molded truck bed liners are generally comprised of a variety of materials such as polyethylene, polypropylene or polyvinylchloride. These liners are generally vacuum-formed to fit a particular configuration of a vehicle bed and then stored in inventory. Once a molded liner is purchased, it is dropped into the vehicle bed and may be attached to the bed to act as a protective liner. The disadvantages of a molded liner are numerous. Molded drop-in-place liners may require drilling or bolting to the vehicle body which exposes the vehicle bed to rust and corrosion. Further, molded vehicle bed liners may warp, crack, tear or vibrate loose. Additionally, no matter how closely the bed liner models that of the vehicle to be lined, the molded liner will leave gaps between the liner and the vehicle bed. The gaps may become filled with dirt, moisture or other materials that create the environment for accelerated corrosion of the vehicle bed beneath the liner. Also, worn out portions of molded liners cannot be replaced or repaired. Thus, the entire molded liner must be replaced after a portion of the liner is worn through, regardless of the condition of the remainder of the liner.

A prior vehicle bed liner which overcomes some of the disadvantages of the molded liner is formed in situ using a sprayable epoxide polymer composition. However, several disadvantages also exist for this type of liner. First, because the epoxide is a slow drying polymer, it flows down the sides of the vehicle bed prior to hardening. This has caused problems in the attempts to create a contiguous bed liner on the sides of the vehicle. Also because epoxy has a slow drying time, its gel and cure times are dependent on the ambient temperatures, which can add hours to the liner's finish time. Further, epoxies tend to be more brittle than other polymers (i.e. polyurethanes, polyethylene, polypropylene) resulting in lower impact strengths. Additionally, epoxies cannot resist the 350° F. temperatures used in hauling asphalt. Other problems result from the method in which the epoxide is applied to the vehicle bed. The epoxide is typically sprayed onto the vehicle bed, incorporating microscopic air bubbles into the epoxide composition. This results in a weaker liner more susceptible to damage by abrasion, impact and normal surface wear. The weaker, less dense liner is usually acceptable for the sides of the vehicle which do not see heavy wear, but the vehicle floor requires a tougher, denser, more abrasion and heat resistant liner.

SUMMARY OF THE INVENTION

An in situ vehicle liner in accordance with the present invention comprises a polyurethane, polyurea or polyurethane/polyurea hybrid polymer which is directly applied to the vehicle bed in liquid form in one or more coats. Each coat is allowed to gel and cure to form the vehicle bed liner. The liner may be formed on the entire vehicle bed or any portion thereof. The polymer is preferably sprayed onto the sides of the vehicle bed, if a liner having side portions is desired, and poured onto the floor of the vehicle bed forming a configured liner.

The invention comprises a polyurethane polymer for forming the vehicle bed liner of the present invention is comprised of:
(a) an isocyanate component, the isocyanate component comprising:
 (i) 70–100 parts by weight methylene-4,4'-diphenyl diisocyanate (MDI); and
 (ii) 0–30 parts by weight of a component selected from the group consisting of polyol and aminic polyol, with the excess in isocyanate groups ranging from 5% to 32.5%;
(b) a polyol component, the polyol component comprising:
 (i) 20–100 parts by weight of a polyether polyol component of functionality of 2 to 4 and an average molecular weight of 400–6,000;
 (ii) 0–60 parts by weight fatty acid saturated polyester;
 (iii) 0–60 parts by weight aminic polyol;
 (iv) 0–5 parts by weight of an organometallic urethane forming catalyst;
 (v) 0–5 parts by weight of an amine urethane forming catalyst; and
 (vi) 0–40 parts by weight of an amine additive compound selected from the group consisting of triethanol amine and a triethanol amine-polyalkylene oxide reaction product.

Alternatively, the material forming the vehicle bed liner of the present invention is preferably a two component urea polymer comprised of:
(a) an isocyanate component, the isocyanate component comprising:
 (i) 70–100 parts by weight methylene-4,4'-diphenyl diisocyanate (MDI); and
(b) an aminic component, the aminic component comprising:
 (i) at least one amine compound, selected from the group consisting of 60–100 parts by weight aromatic diamine, 60–100 parts by weight aliphatic amine, and 60–100 parts by weight any combination thereof; and
 (ii) 0–40 parts by weight of an amine additive compound selected from the group consisting of triethanol amine and a triethanol amine-polyalkylene oxide reaction product.

A polyurethane/polyurea hybrid polymer is also a subject of the present invention used to form the vehicle bed liner and is preferably comprised of:
(a) an isocyanate component, the isocyanate component comprising:
 (i) 70–100 parts by weight methylene-4,4'-diphenyl diisocyanate; and
 (ii) 0–30 parts by weight of a component selected from the group consisting of polyol and aminic polyol, with the excess in isocyanate groups ranging from 5% to 32.5%;
(b) a polyol/amine component, the polyol/amine component comprising:
 (i) 1–99 parts by weight of a polyether polyol component of functionality of 2 to 4 and an average molecular weight of 400–6,000;

(ii) 0–60 parts by weight fatty acid saturated polyester;
(iii) at least one amine component, selected from the group consisting of 1–99 parts by weight aromatic diamine, 1–99 parts by weight aliphatic amine, and 1–99 parts by weight any combination thereof;
(iv) 0–60 parts by weight aminic polyol;
(v) 0–5 parts by weight of an organometallic urethane forming catalyst;
(vi) 0–5 parts by weight of an amine urethane forming catalyst; and
(vii) 0–40 parts by weight of an amine additive compound selected from the group consisting of triethanol amine and a triethanol amine-polyalkylene oxide reaction product.

The invention further comprises a polymer containing a thixotropic agent.

The vehicle bed in which the liner is to be created is preferably fitted with a retainer strip at the rear edge of the vehicle bed. The retainer strip prevents loss of the applied polymer from the vehicle bed during application of the liquid polymer and allows for production of a tapered liner floor.

The vehicle bed in which the liner is to be produced is preferably prepared by scouring the surface. The vehicle bed is then leveled, and the front of the bed preferentially elevated several degrees to produce a tapered liner floor.

The liquid polymer used to create the vehicle liner is a two-part polymer system wherein the parts in liquid form are mixed together immediately prior to application to the vehicle bed. Upon mixing, the two component system reaches its gel point almost immediately. This allows the polymer to be applied to vertical surfaces of the vehicle bed without significant amounts of sagging or running of the polymer material that would impede smooth formation of the liner. A spray gun is used for application of the material to the sides of the vehicle bed such that the two components of the polymer are mixed together for the first time just prior to leaving the manifold of the spray gun. The gel point of the polymer is reached shortly after contact of the polymer material with the vehicle bed.

The polymer components are heated to between about 70° F. and about 200° F., and then pumped at a pressure between about 500 and 2,500 psi through the spray gun and sprayed along the vertical surfaces of the vehicle bed. The spray gun utilizes high pressure to thoroughly mix the two components of the polymer immediately prior to exiting the spray gun. The vertical surfaces of the vehicle bed are given a contiguous coating of the polymer material and the coating is allowed to gel. After gelation, additional contiguous coatings may be applied to the vertical surfaces of the vehicle bed until the desired thickness of the liner is reached. A low pressure/high volume dispensing gun is then used to pour the polymer material onto the horizontal surfaces or floor of the vehicle bed. The material is poured rather than sprayed in order to minimize air bubble incorporation into the polymer mixture, creating a denser product. Preferably, a static mixer is attached to the dispensing gun to ensure proper mixing of the two components of the polymer prior to contact with the vehicle bed floor. A pressure between about 50 and 2000 psi is used during pouring. The pouring process is started in the front corners of the vehicle and poured slowly from side to side, ensuring that each new pass of product from the dispensing gun flows quickly to meet the last line of polymer material poured. This pattern is continued until the end of the floor is reached. Once the poured surface is tack-free, additional layers of polymer may be poured to reach the desired thickness.

Further objects, features and advantages of the invention will be apparent from the following detailed description taken in conjunction with the accompanying drawings.

DETAILED DESCRIPTION OF THE INVENTION

Figure 1:
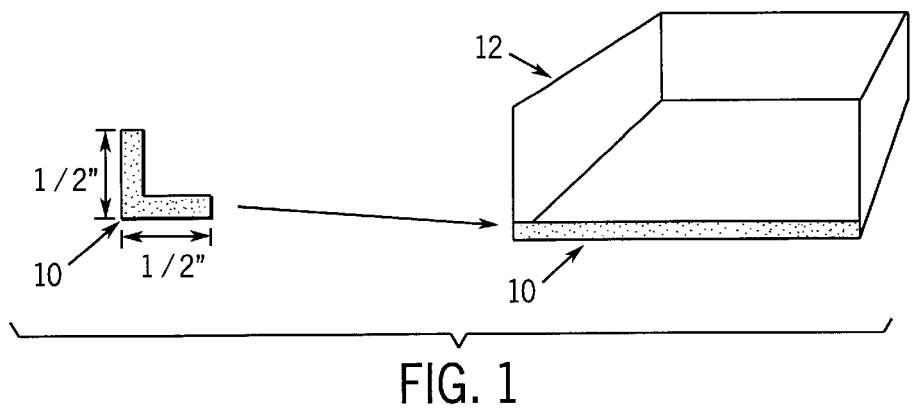
FIG. 1 is a side view of a rear retainer strip which is placed on the rear edge of a dump truck vehicle bed in accordance with the present invention.

An in situ vehicle bed liner of the present invention will be illustrated in the following example using a standard 17 foot dump truck box as a vehicle bed. However, it should be noted that the invention may be used on a wide variety of vehicle beds, including pick-up truck beds, industrial truck beds, asphalt haulers, tractor trailer floors and walls, horse and livestock trailers, cargo and delivery service vans, snowmobile and boat trailers, sewage vacuum trucks, fertilizer and chemical trucks, recycling collection trucks, waste disposal trucks and animal transport vans.

The in situ liner of the following example will cover the entire vehicle bed, including both sides and floor of the vehicle bed. However, an in situ liner could be created which covers only a portion of the vehicle bed, such as the floor. Such partial liners are within the scope of the present invention.

The liner of the present invention may also be used on non-vehicle bed surfaces, such as concrete pipes, chutes and manholes, street sweeper hoppers, sand and salt spreaders, manure spreaders, snowplow blades, loader buckets, industrial rigs and work surfaces, tank farm containment, boat docks, buoys, gravity boxes; hopper, coal, grain and box rail cars.

The polyurethane, polyurea or polyurethane/polyurea hybrid polymer used for creating the vehicle bed liner's vertical surfaces should be a polymer that reaches its gel point almost immediately upon application to the vehicle bed. The term "gel point" is herein defined as the onset of gelation such that the polymer undergoes a sudden increase in viscosity and undergoes an almost instantaneous change from a liquid to a gel. The term "almost immediately" is herein defined as a period of time, typically about 3 to 60 seconds, which is insufficient to allow significant flowing or sagging of the polymer material on vertical or highly inclined surfaces prior to reaching the gel point. The inventors have surprisingly and unexpectedly found that by using polymers which reach their gel point immediately upon application, a contiguous bed liner that avoids sagging or running on vertical or highly inclined surfaces can be formed. The inventors have also discovered that by adding a thixotropic agent such as fumed silica or BYK-LP R 6237 (BYK chemie, Wallingford, Conn.) to such polymers will further prevent flowing or sagging of the polymer material when applied to such surfaces.

The vehicle bed liner of the present invention is a polyurethane, polyurea or polyurethane/polyurea hybrid polymer. A polyurethane/polyurea hybrid is herein defined as a polymer containing both an aminic and polyol portion to the polyol/amine component of the polymer.

A polyurethane polymer for forming the vehicle bed liner of the present invention is comprised of:
(a) an isocyanate component, the isocyanate component comprising:
  (i) 70–100 parts by weight methylene-4,4'-diphenyl diisocyanate (MDI); and
  (ii) 0–30 parts by weight of a component selected from the group consisting of polyol and aminic polyol, with the excess in isocyanate groups ranging from 5% to 32.5%;
(b) a polyol component, the polyol component comprising:
  (i) 20–100 parts by weight of a polyether polyol component of functionality of 2 to 4 and an average molecular weight of 400–6,000;
  (ii) 0–60 parts by weight fatty acid saturated polyester;
  (iii) 0–60 parts by weight aminic polyol;
  (iv) 0–5 parts by weight of an organometallic urethane forming catalyst;
  (v) 0–5 parts by weight of an amine urethane forming catalyst; and
  (vi) 0–40 parts by weight of an amine additive compound selected from the group consisting of triethanol amine and a triethanol amine-polyalkylene oxide reaction product.

Alternatively, the material forming the vehicle bed liner of the present invention is preferably a two component urea polymer comprised of:
(a) an isocyanate component, the isocyanate component comprising:
  (i) 70–100 parts by weight methylene-4,4'-diphenyl diisocyanate (MDI); and
(b) an aminic component, the aminic component comprising:
  (i) at least one amine compound, selected from the group consisting of 60–100 parts by weight aromatic diamine, 60–100 parts by weight aliphatic amine, and 60–100 parts by weight any combination thereof; and
  (ii) 0–40 parts by weight of an amine additive compound selected from the group consisting of triethanol amine and a triethanol amine-polyalkylene oxide reaction product.

The polyurethane/polyurea hybrid polymer used to form the vehicle bed liner of the present invention is preferably comprised of:
(a) an isocyanate component, the isocyanate component comprising:
  (i) 70–100 parts by weight methylene-4,4'-diphenyl diisocyanate; and
  (ii) 0–30 parts by weight of a component selected from the group consisting of polyol and aminic polyol, with the excess in isocyanate groups ranging from 5% to 32.5%;
(b) a polyol/amine component, the polyol/amine component comprising:
  (i) 1–99 parts by weight of a polyether polyol component of functionality of 2 to 4 and an average molecular weight of 400–6,000;
  (ii) 0–60 parts by weight fatty acid saturated polyester;
  (iii) at least one amine component, selected from the group consisting of 1–99 parts by weight aromatic diamine, 1–99 parts by weight aliphatic amine, and 1–99 parts by weight any combination thereof;
  (iv) 0–60 parts by weight aminic polyol;
  (v) 0–5 parts by weight of an organometallic urethane forming catalyst;
  (vi) 0–5 parts by weight of an amine urethane forming catalyst; and
  (vii) 0–40 parts by weight of an amine additive compound selected from the group consisting of triethanol amine and a triethanol amine-polyalkylene oxide reaction product.

The ratio of parts by weight of (a) components to parts by weight of (b) components in all of the forgoing formulas should give an index of from about 102 to 110, preferably 105. An index of 105 is known to those of ordinary skill in the art as reacting at least 1.05 equivalents of (a) (isocyanate groups) with one equivalent of (b) (active hydrogen containing components).

If the polyol or aminic polyol component (a) (ii) in any of the preceding formulas is greater than 0 parts by weight, an isocyanate quasi pre-polymer is prepared by reacting the (a) ingredients at a temperature between 60°–300° F. for 2–3 hours.

Other materials may be added to the polymer liner composition, such as fillers, pigments, air release agents, internal lubricants and/or surfactants which can assist in increased tensile strength, tear strength, impact strength, hardness or decreased shrinkage, increased moisture and/or heat resistance, decreased flow, increased or decreased slip. Some fillers which may be employed are silica, silicates, graphite, molybdenum disulfide, carbons, silicones, Teflon®, calcium carbonates, clays, aluminum oxides, magnesium oxides, iron oxides, titanium dioxides, and the like. Pigments may be added for coloring, hiding or UV inhibiting purposes.

A preferred polymer composition for use in the present invention is as follows:
(a) An isocyanate component comprising a 21% NCO Quasi Pre-Polymer prepared by mixing three to one a uretonimine modified 29% NCO MDI (Tedimon-316™, EniChem, Amsterdam, Netherlands) with a 4,800 MW polyether triol (glycerin starter) containing, with random distribution, 70% by weight ethylene oxide (EO) and 30% by weight propylene oxide (PO) (polyol TERCAPUR 1264, EniChem, Amsterdam, Netherlands); and
(b) A polyol/amine component comprising:
  (i) 25 parts by weight dimethylthio toluene diamine, (ETHACURE-300, Albermarle Corporation, Baton Rouge, La.);
  (ii) 25 parts by weight 4,800 MW, EO capped polyether triol OH #35 (EO lower then 30% by weight) (Polyol T-555™, EniChem, Amsterdam, Netherlands)
  (iii) 50 parts by weight 4,800 MW, 70% (EO and 30% PO random polyether triol (Polyol T-1264™, EniChem, Amsterdam, Netherlands);
  (iv) 0.01 part by weight dibutyl tin dilaurate; and
  (v) 0.01 parts by weight triethylene diamine (DABCO 33LV, Air Products & Chemicals, Inc., Allantown, Pa.).

An in situ vehicle bed liner is prepared on a dump truck bed as follows.

Figure 2:
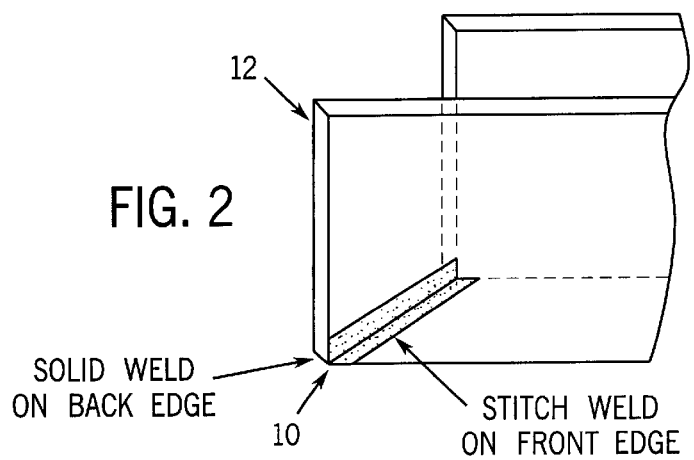
FIG. 2 is a partial side view of the rear retainer strip welded to the rear edge of a dump truck vehicle bed in accordance with the present invention.

Any bolted on hardware or other attachments on the bed of the dump truck which are not to be coated by the liner are removed. An edge is made on the end of the dump truck bed floor to contain the liquid polymer until it is gelled. Preferably this is done with an ⅛th inch thick angle iron 10, as shown in FIG. 1, having dimensions of ½"×½" and a length equal to the inside measurement of the rear edge of the dump truck bed. This is welded to the rear edge of the dump truck bed 12 as shown in FIG. 2. The angle iron is positioned approximately ⅛th inch forward from the rear edge of the dump truck box to allow for welding and tight fitting tailgates. The angle iron is solid welded across the full length of the rear edge of the angle iron relative to the front of the truck. The angle iron is then stitch welded along the full length of the front edge of the angle iron relative to the front of the truck.

Suitable protective materials such as masking paper and/or thin plastic such as polyethylene are placed on areas of the truck nearby or adjacent to the area wherein the polymer liner is to be formed. This is to protect those areas of the truck from undesired application of polymer material or cleaning matter.

The surface of the dump truck bed to be coated with the polymer composition should have a clean, etched surface for good adhesion. This may be accomplished by blasting the surface with 12/20 coal slag using a commercially available sandblaster or other equivalent material. Sandblasting prepares a surface by removing unwanted contaminants and putting microscratches and microdeformations in the surface of the vehicle bed. After sandblasting, the abrasive material is removed from the dump truck bed, preferably with high pressure air and mechanical means such as by broom.

Figure 3:
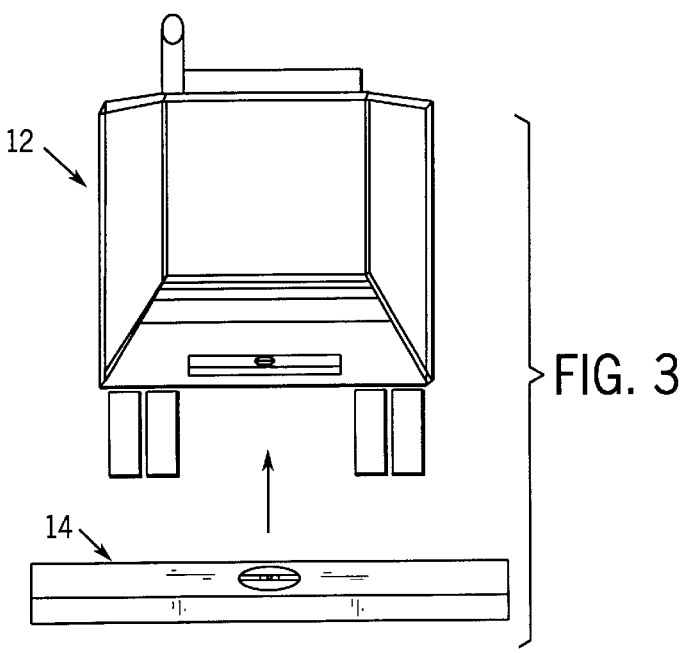
FIG. 3 is a rear view of a dump truck vehicle bed and a level adjusted in accordance with the present invention.
Figure 4:
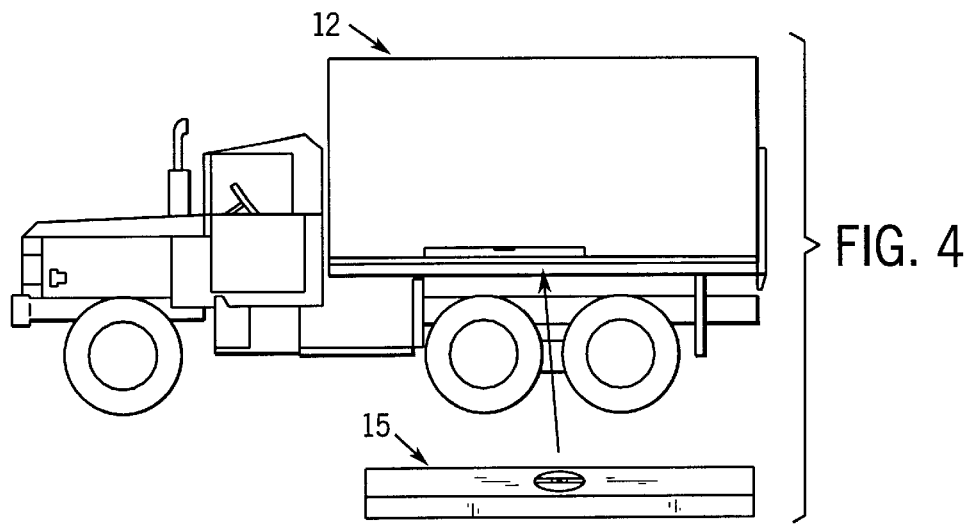
FIG. 4 is a side view of a dump truck vehicle bed and a level adjusted in accordance with the present invention.

The dump truck should be leveled from side to side as shown in FIG. 3, and slightly inclined from front to back as shown in FIG. 4. To level the dump truck from side to side, as shown in FIG. 3, a four foot or longer level 14 is placed parallel to the rear edge of the truck bed 12, and the truck positioned so that the bubble in the level 14 is centered. The dump truck bed 12 is then slightly inclined by placing a four foot or longer level 15 parallel to the sides of the dump truck bed 12, and using the hydraulic system to operate the dump feature of the dump truck bed 12 to slightly raise the front end of the dump truck bed 12 a few degrees to the high side of the bubble within the level 15, as shown in FIG. 4. By creating an inclined vehicle bed surface, a tapered liner floor is produced whereby the thickness of the liner at the rear of the vehicle will be greater than in the front. The portion of the liner floor at the rear of the vehicle undergoes the most wear and stress; therefore, it is helpful to produce a tapered liner having a thicker rear segment. The floor of the finished liner may range in depth from about ⅛" at the front edge of the liner to about 1" at the rear edge. The preferred range is from about ¼" at the front of the liner to about ½" at the rear edge.

To create the proper angle of the vehicle bed on vehicles lacking hydraulic lifts, blocks may be placed under the front wheels of the vehicle if a tapered liner floor is desired.

One of the pumps of the plural component proportioner (Gusmer® VH-3000 Plural Component High Pressure Metering Unit from Gusmer, Lakewood, N.J.) is placed into the isocyanate component and the other into the polyol/amine component of the polymer composition. The chemicals are then heated to between about 70° F. and 200° F., preferably between about 100° F. and 150° F.

Figure 5:
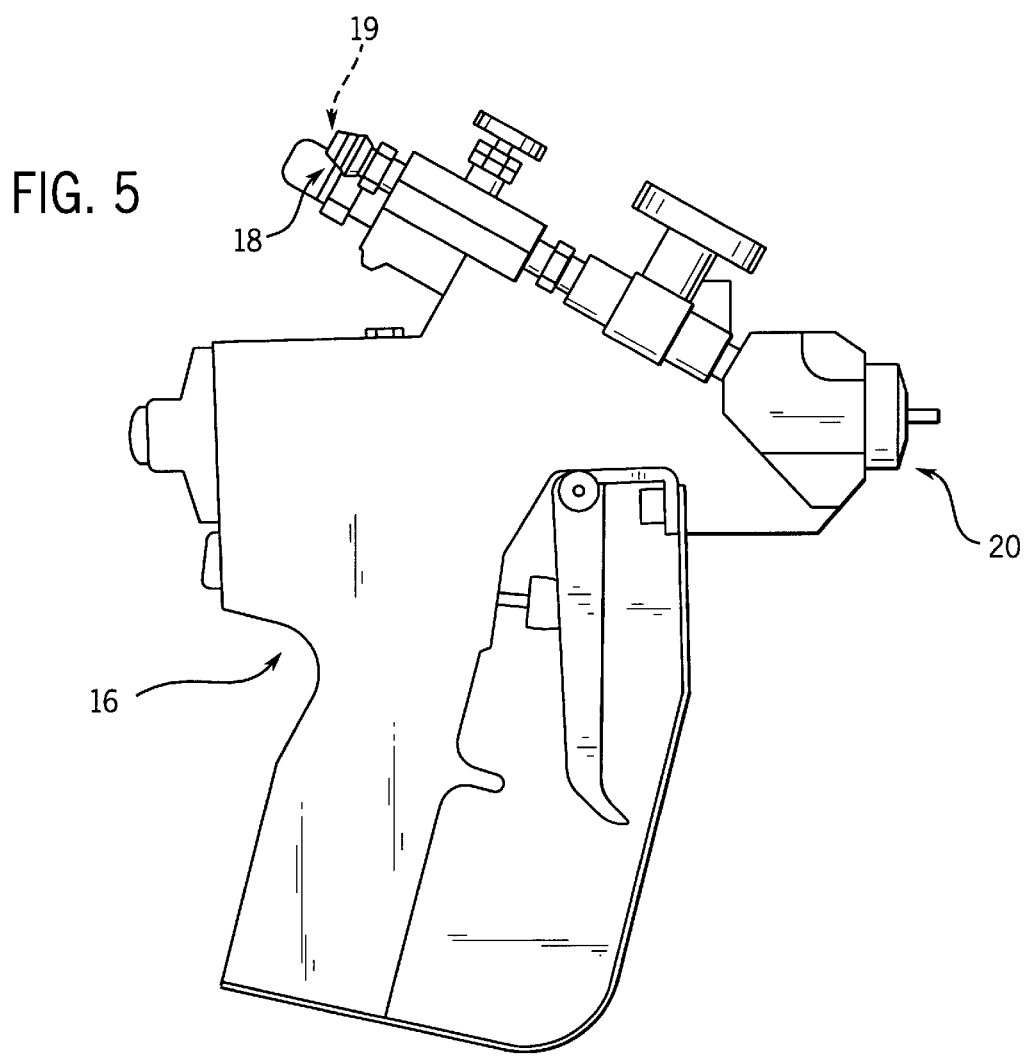
FIG. 5 is a side view of a spray gun for use in accordance with the present invention (prior art).

Each of the polymer components are delivered separately from the proportioner to a spray gun (Probler® gun from Glas-Craft®, Indianapolis, Ind.) through high pressure, temperature controlled lines and propelled through the gun via high pressure. The pressure is set on the proportioner between about 500 and 2500 psi, preferably between about 800 and 2200 psi. A spray gun 16 as illustrated in FIG. 5 is used to spray the polymer materials on the vertical surfaces, or sides, of the dump truck bed. As illustrated in FIG. 5, one component of the polymer enters the spray gun through gate 18 and the other polymer component enters separately through gate 19 (not visible). Both components exit the spray gun 16 from the manifold 20, and mixing of the polymer components occurs just prior to exiting the manifold 20. The high pressure used to drive the polymer from the spray gun 16 ensures complete mixing of the polymer components prior to reaching the body of the vehicle bed. The mixed polymer reaches its gel point almost immediately upon contact with the sides of the dump truck bed.

The sides of the vehicle bed are sprayed in a manner to produce a contiguous coating of the polymer material along the entire sides and front of the dump truck bed. The sides are allowed to gel, and further layers of the polymer composition may be applied to the sides of the dump truck bed as previously described until the vehicle bed liner is the desired thickness range of about ⅛" to about ½", preferably about ¼".

Figure 6:
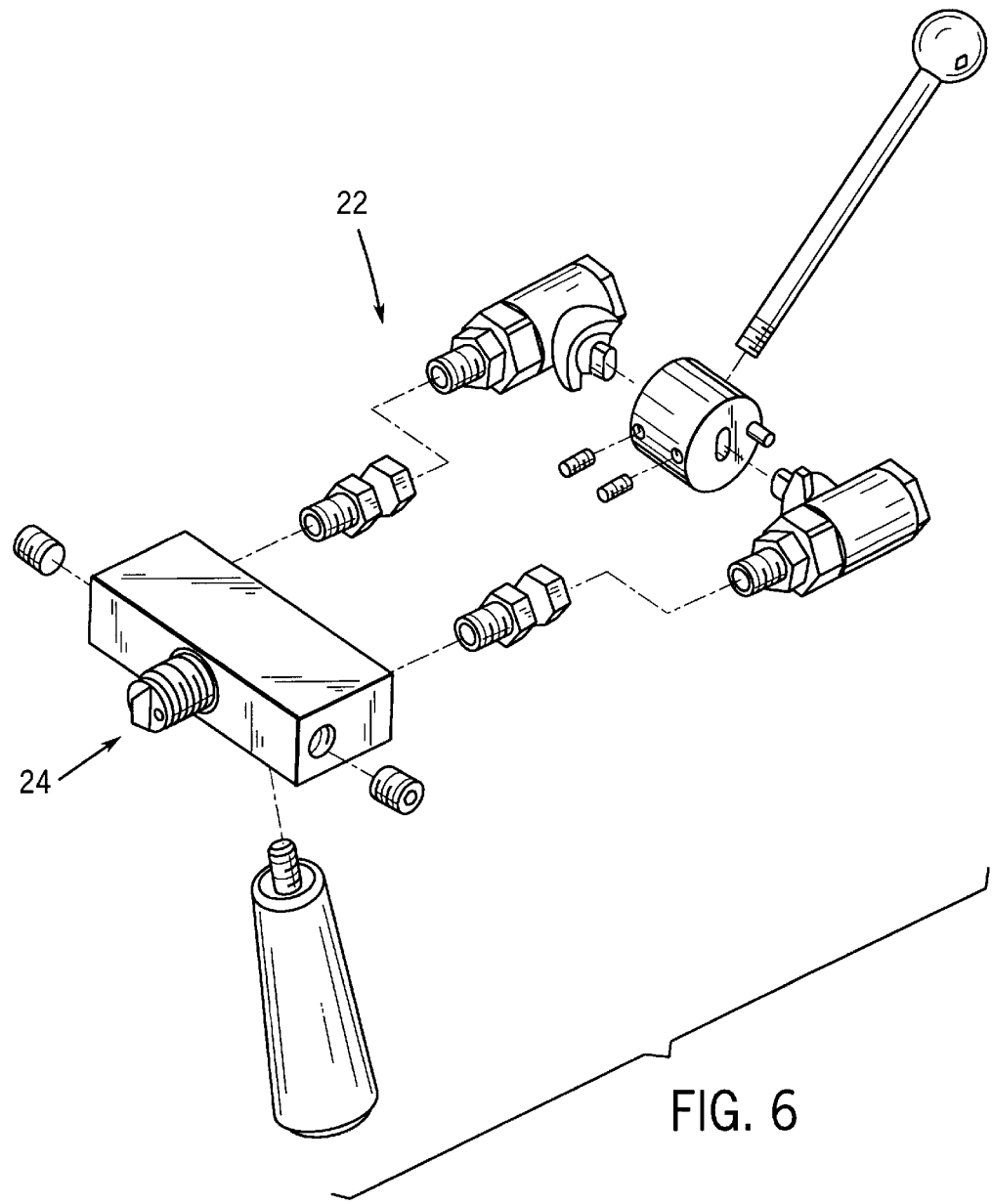
FIG. 6 is an exploded view of a dispense gun for use in accordance with the present invention (prior art).

A manual/low pressure dispensing gun 22, as shown in FIG. 6 (Model Number 550-100/200, TAH Industries, Inc., Robbinsville, N.J.) is used to create the horizontal or floor portion of the vehicle bed liner. The low pressure dispense gun may be used with the same proportioner as used in lining the vertical surfaces or another plural component proportioner may be used. The low pressure dispense gun transports the required amounts of the (a) and (b) components of the polymer separately until they enter the spiral mixer (Series 160 Spiral Mixer with Bell Nozzle, TAH Industries, Inc., Robbinsville, N.J.) (not shown) which is attached to the manifold 24 of the dispensing gun 22. The spiral mixer is used to ensure that the two components of the polymer mix completely prior to contact with the floor of the vehicle bed. The dispensing gun 22 operates without the use of high pressure, to ensure that microbubbles of air are not incorporated into the polymer, resulting in a superior finished product. It has been surprisingly and unexpectedly discovered by the inventors that by pouring the floor of the liner rather than spraying the liner, a more durable structure can be created. This additional strength is very important in the parts of the vehicle bed liner, such as the floor, which will be subject to the most amount of abrasion and high temperature. The mixer of the preferred embodiment should have a mixing element diameter of from about 0.187 inches to 0.500 inches, preferably from 0.370 inches to 0.500 inches. The mixer should contain from 8 to 40 elements, preferably 36to 40. Using the dispense gun, the floor of the in situ liner is poured using a proportioning pressure of between about 50 and 2000 psi, preferably between 250 and 900 psi. The material is poured starting in the front corners of the vehicle bed and pouring slowly from side to side, ensuring that each new pass of poured material flows quickly to meet the last material which has been poured, approximately 4–5 inches apart. This pour pattern is continued until the end of the dump bed is reached. A scaffold may be used for finishing the rear of the vehicle. To help in pouring a vehicle bed floor of consistent thickness, usually about ¼ inch to about ½ inch, a marker of the desired thickness can be placed on the surface beforehand. The marker should be made from a cured sample of the material being applied.

Once the surface is tack-free, additional layers of the polymer material may be applied until the desired thickness is reached. If desired, the surface of the vehicle bed liner may be abraded or etched to provide additional traction to the surface after the liner surface becomes tack-free but prior to hardening.

If necessary, the liner may be trimmed with a utility knife once the liner is tack-free. Finally, any hardware or attachments that have been removed from the vehicle box may be re-attached.

The liner then cures at ambient temperature. The liner is functional within hours, but reaches its maximum properties after 24–72 hours.

The finished liner may be repaired and/or renewed anytime after usage has begun, by spraying or pouring additional polymer material into the area(s) where wearing of the polymer liner has occurred.

Alternatively, an in situ vehicle bed liner that covers only the floor of the vehicle bed may be prepared by placing suitable protective materials on the sides of the vehicle bed and pouring only the floor of the vehicle liner in the manner previously described.

It is understood that this invention is not confined to the particular embodiments herein illustrated and described, but embraces all such modified forms thereof as come within the scope of the following claims.

What is claimed is:

1. A method of forming a vehicle bed liner in situ comprising the steps of:
    (a) providing a polymer composition selected from the group consisting of polyurethane, polyurea and polyurethane/polyurea;
    (b) providing a vehicle bed having sides and a floor, the floor having a proximate first edge and a distal second edge;
    (c) applying the composition directly to the sides of the vehicle bed to form a liner;
    (d) pouring the composition directly onto the floor of the vehicle bed creating a floor layer of the vehicle bed liner which is tapered and has a minimum thickness of one eighth inch at the first edge of the floor of the vehicle bed and a minimum thickness of one half inch at the second edge of the floor of the vehicle bed; and
    (e) curing the liner on the vehicle bed.

2. The method of forming a vehicle bed liner in situ of claim 1 wherein step (a) further comprises providing a polymer composition comprising:
    (i) a liquid isocyanate prepolymer resin; and
    (ii) a polyol component if the composition is polyurethane, an amine component if the composition is a polyurea otherwise a polyol/amine component if the composition is polyurethane/polyurea.

3. The method of forming a vehicle bed liner in situ of claim 1 wherein step (a) further comprises providing a polyurea polymer composition comprising:
    (i) an isocyanate component, the isocyanate component comprising:
        (A) 70–100 parts by weight methylene-4,4'-diphenyl diisocyanate;
    (ii) an amine component, the amine component comprising:
        (A) at least one amine compound selected from the group consisting of 60–100 parts by weight aromatic diamine, 60–100 parts by weight aliphatic amine, and 60–100 parts by weight any combination thereof; and
        (B) 0–40 parts by weight of an amine reactant compound selected from the group consisting of triethanol amine and a triethanol amine-polyalkylene oxide reaction product.

4. The method of forming a vehicle bed liner in situ of claim 1, wherein the polymer contains a thixotropic agent.

5. The method of forming a vehicle bed liner in situ of claim 3, wherein the polymer contains a thixotropic agent.

6. The method of forming a vehicle bed liner in situ of claim 1 wherein steps (c) and (d) further comprise:
    (i) spraying the composition onto the sides of the vehicle bed to form a continuous side layer of the composition on the sides of the vehicle bed;
    (ii) allowing the continuous side layer to gel;
    (iii) repeating steps (i) and (ii) until the sides of the vehicle bed liner have been formed;
    (iv) pouring the composition onto the floor of the vehicle bed to form a continuous floor layer of the composition on the floor of the vehicle bed which is contiguous with the side layer;
    (v) allowing the continuous floor layer to gel;
    (vi) repeating steps (iv) and (v) until the vehicle bed liner has been formed.

7. The method of forming a vehicle bed liner in situ of claim 3 wherein steps (c) and (d) further comprise:
    (i) spraying the composition onto the sides of the vehicle bed to form a continuous side layer of the composition on the sides of the vehicle bed;
    (ii) allowing the continuous side layer to gel;
    (iii) repeating steps (i) and (ii) until the sides of the vehicle bed liner have been formed;
    (iv) pouring the composition onto the floor of the vehicle bed to form a continuous floor layer of the composition on the floor of the vehicle bed which is contiguous with the side layer;
    (v) allowing the continuous floor layer to gel;
    (vi) repeating steps (iv) and (v) until the vehicle bed liner has been formed.

8. A method of forming a vehicle bed liner in situ comprising the steps of:
    (a) providing a polymer composition comprising:
        (i) an isocyanate component, the isocyanate component comprising:
            (A) 70–100 parts by weight methylene-4,4'-diphenyl diisocyanate; and
            (B) 0–30 parts by weight of a component selected from the group consisting of polyol and aminic Polyol, with the excess in isocyanate groups ranging from 5% to 32.5%;
        (ii) a polyol/amine component, the polyol/amine component comprising:
            (A) 1–99 Parts by weight of a polyether polyol component of functionality of 2 to 4 and an average molecular weight of 400–6,000;
            (B) 0–60 parts by weight fatty acid saturated polyester;
            (C) at least one amine component, selected from the group consisting of 1–99 parts by weight aromatic diamine, 1–99 parts by weight aliphatic amine, and 1–99 parts by weight any combination thereof;
            (D) 0–60 parts by weight aminic polyol;
            (E) 0–5 parts by weight of an organometallic urethane forming catalyst;
            (F) 0–5 parts by weight of an amine urethane forming catalyst; and
            (G) 0–40 parts by weight of an amine additive compound selected from the group consisting of triethanol amine and a triethanol amine-polyalkylene oxide reaction product;
    (b) providing a vehicle bed having sides and a floor, the floor having a proximate first edge and a distal second edge;

(c) preparing the vehicle bed by blasting the bed with a coarse material;

(d) cleaning the vehicle bed;

(e) spraying the composition onto the sides of the vehicle bed to form a continuous side layer of the composition on the sides of the vehicle bed;

(f) allowing the continuous side layer to gel;

(g) repeating steps (e) and (f) until the sides of the vehicle bed liner have been formed;

(h) pouring the composition onto the floor of the vehicle bed to form a continuous floor layer of the composition on the floor of the vehicle bed which is contiguous with the side layer;

(i) allowing the continuous floor layer to gel;

(j) repeating steps (h) and (i) until the vehicle bed liner has been formed, such that the floor layer is tapered and has a minimum thickness of one eighth inch at the first edge of the floor of the vehicle bed and a minimum thickness of one half inch at the second edge of the floor of the vehicle bed; and (k) curing the liner on the vehicle bed at a temperature between about 50° F. to about 110° F.

9. An in situ formed vehicle bed liner comprising a polymer composition selected from the group consisting of polyurethane, polyurea, and polyurethane/polyurea wherein the polymer composition is directly applied to at least a portion of a vehicle bed in liquid form, such that the polymer composition is poured to form a vehicle liner floor portion having a proximate first edge and a distal second edge, wherein the floor portion is tapered such that the floor portion first edge has a minimum thickness of one eighth inch and the floor portion second edge has a minimum thickness of one half inch, the polymer composition gelled to form a vehicle bed liner.

10. The in situ formed polymer vehicle bed liner of claim 9, wherein the polymer is a polyurea polymer comprising:

(i) an isocyanate component, the isocyanate component comprising:

(A) 70–100 parts by weight methylene-4,4'-diphenyl diisocyanate;

(ii) an amine component, the amine component comprising:

(A) at least one amine compound selected from the group consisting of 60–100 parts by weight aromatic diamine, 60–100 parts by weight aliphatic amine, and 60–100 parts by weight any combination thereof; and (B) 0–40 parts by weight of an amine reactant compound selected from the group consisting of triethanol amine and a triethanol amine-polyalkylene oxide reaction product;

wherein the liquid polyurea is sprayed onto the sides of a vehicle bed and poured onto the floor of the vehicle bed to form a contiguous coating which thereafter gels and cures to form a vehicle bed liner.

11. The in situ formed polymer vehicle bed liner of claim 9, wherein the polymer contains a thixotropic agent.

12. The in situ formed polymer vehicle bed liner of claim 10, wherein the polymer contains a thixotropic agent.

13. The method of forming a vehicle bed liner in situ of claim 1, wherein the resulting floor portion of the vehicle bed liner is tapered and has a minimum thickness of one quarter inch at the first edge of the vehicle bed and a minimum thickness of one inch at the second edge of the vehicle bed.

14. The method of forming a vehicle bed liner in situ of claim 8, wherein step (j) further comprises repeating steps (h) and (i) until the vehicle bed liner has been formed, such that the floor layer is tapered and has a minimum thickness of one quarter inch at the first edge of the floor of the vehicle bed and a minimum thickness of one inch at the second edge of the floor of the vehicle bed.

15. The in situ formed polymer vehicle bed liner of claim 9, wherein the floor portion first edge has a minimum thickness of one quarter inch and the floor portion second edge has a minimum thickness of one inch.

16. The method of forming a vehicle bed liner in situ of claim 1, wherein the vehicle bed liner is a truck bed liner.

17. The method of forming a vehicle bed liner in situ of claim 8, wherein the vehicle bed liner is a truck bed liner.

18. The in situ formed polymer vehicle bed liner of claim 9, wherein the vehicle bed liner is a truck bed liner.

19. The method of forming a vehicle bed liner in situ of claim 13, wherein the vehicle bed liner is a truck bed liner.

20. The in situ formed polymer vehicle bed liner of claim 15, wherein the vehicle bed liner is a truck bed liner.

* * * * *